No. 875,221. PATENTED DEC. 31, 1907.
S. F. SNYDER.
CREMATOR FOR INSECTS.
APPLICATION FILED FEB. 15, 1907.

Witnesses
O. W. Holmes
Rea P. Ubright

Inventor
S. F. Snyder
By Onward Brock
Attorneys

THE NORRIS PETERS CO., WASHINGTON, D. C.

UNITED STATES PATENT OFFICE.

SAMUEL F. SNYDER, OF CANTON, OHIO.

CREMATOR FOR INSECTS.

No. 875,221.  Specification of Letters Patent.  Patented Dec. 31, 1907.

Application filed February 15, 1907. Serial No. 357,546.

*To all whom it may concern:*

Be it known that I, SAMUEL F. SNYDER, a citizen of the United States, residing at Canton, in the county of Stark and State of Ohio, have invented a new and useful Improvement in a Cremator for Insects, of which the following is a specification.

This invention relates to insect destroyers and more particularly to insects cremators, the object being to provide a machine which will remove the insect from the plants and cremate them as it is drawn between the rows.

Another object of my invention is to provide the machine with very novel means for adjusting the brushes so that they can be easily and quickly adjusted from the seat of the vehicle so that they can be forced outwardly or upwardly to suit different size plants.

Another object of my invention is to provide very novel collecting plates so mounted in the machine that by pressing down on a lever and releasing the same the insect on the plate will be thrown into the pan and cremated.

With these and other objects in view, the invention consists in the novel features of construction, combination and arrangement of parts hereinafter fully described and pointed out in the claims.

Figure 1:
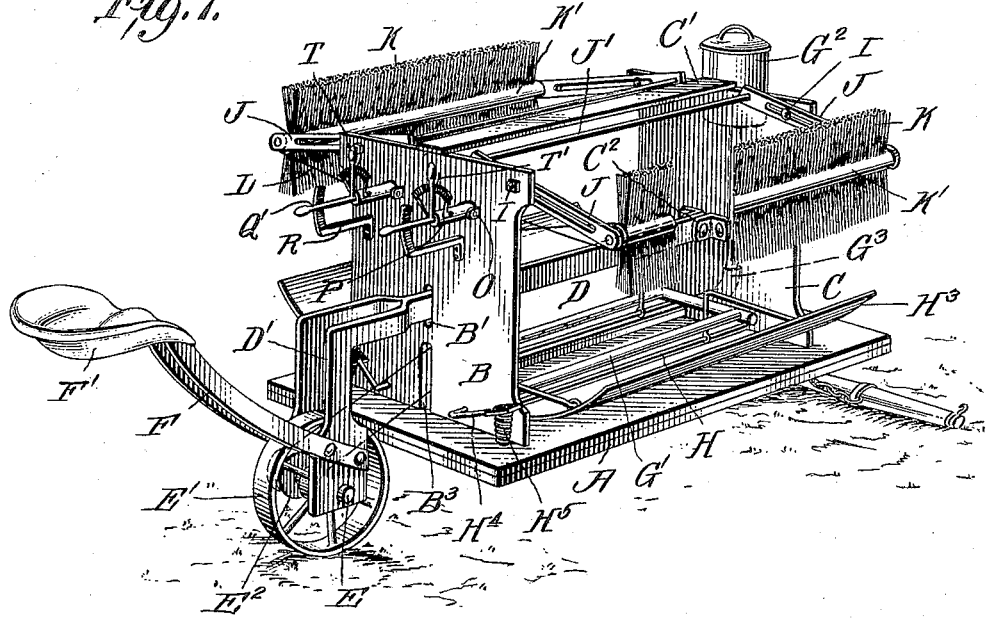
Figure 2:
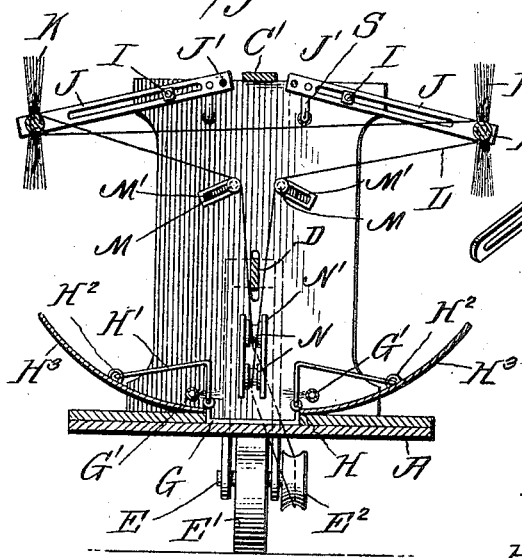
Figure 3:
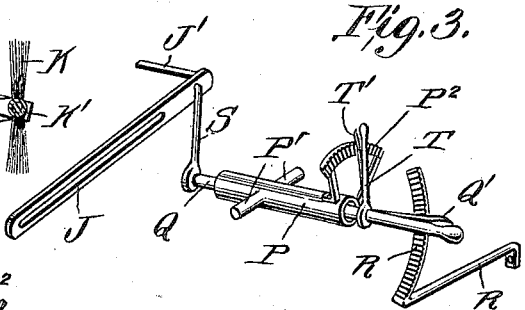
Figure 4:
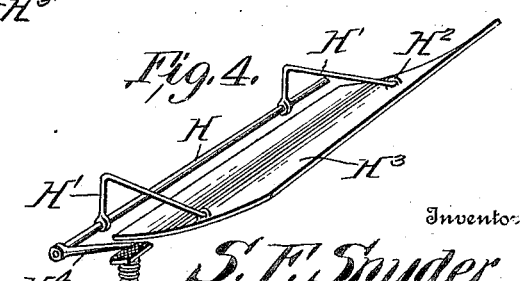

In the drawings forming a part of this specification:—Figure 1 is a perspective view of my improved insect cremator. Fig. 2 is a vertical sectional view through the same. Fig. 3 is a perspective view of the brush adjusting means detached. Fig. 4 is a perspective view of one of the collecting plates.

In the drawing A indicates a platform provided with upwardly projecting ends B and C adjacent each end, connected together at the top by a central bar C'. Secured to the inside of the end C is a bracket $C^2$ in which is mounted the end of a beam D which extends through a slot B' in the end B, and is provided with an angled forked end D' in which is mounted an axle E provided with a fixed wheel E' and a fixed pulley $E^2$. A pair of curved bars F are secured to the forked end of the beam D carrying a seat F'. A chain is secured to the forward end of the platform carrying a swingletree by means of which the machine is drawn.

A recess is formed in the platform between the ends in which is secured a receiving pan G to each side of which is arranged a burner G' connected to an oil tank $G^2$ mounted on the outside of the end C, by a pipe $G^3$ so that the insects will be cremated as they drop into the pan.

Mounted on the side edge of the pan in openings in the ends, are shafts H provided with angled arms H' having angled ends $H^2$ which are mounted in eyes formed on curved plates $H^3$ which are adapted to catch the insects and deposit them in the pan. The rear ends of the shaft project out beyond the end B and are provided with levers $H^4$ having flattened angled ends under which on the platform are arranged coil-springs $H^5$ adapted to hold the plates in the position shown. It will be seen that pressing down on the levers with the foot, the plates will be forced downwardly and outwardly and will spring upwardly when released so as to throw the insects into the pan.

Secured to the upper corners of the ends B and C are bolts I on which are mounted slotted arms J connected together at their inner ends by cross bars J' and provided with apertured outer ends in which are mounted brushes K provided with pulleys K' over which passes a belt L which passes inwardly over the pulleys M mounted in spring journal bearings M' secured to the inside of the end B, then downwardly over the pulleys N carried by a frame N', secured to the inside of the end B, and then out through a slot $B^3$ formed in the lower end of the end B and over the pulley E' carried by the axle so that when the machine is moved forwardly, the brushes will be rotated so as to brush the insects off the plants onto the plates $H^3$ and into the pan.

Spaced ears O are secured to the outside of the end B to each side of its center adjacent its upper end, in which are pivotally mounted the oppositely disposed lugs P' of sleeves P, in which are mounted levers Q provided with hand-levers Q' which engage the segmental racks R' of brackets R secured to the end B. Cranks S are secured on the inner end of the lever Q provided with angled ends which are mounted in the inner ends of the arms J, so that by pressing down on the lever Q the brushes will be raised and lowered as desired.

Levers T are mounted on the levers Q adjacent the end of the sleeves P provided with hand-lever T' adapted to engage a segmental rack $P^2$ mounted on the sleeve P, so that by turning the lever the arms J can be forced outwardly and drawn in and locked as desired so as to suit different width rows.

Having thus fully described my invention, what I claim as new and desire to secure by Letters Patent is:—

1. In a device of the kind described the combination with a platform, of collecting plates pivotally mounted thereon and means for operating said plates.

2. In a device of the kind described, the combination with a platform provided with a pan of burners arranged to each side of said pan and collecting means carried by said platform.

3. In a device of the kind described, the combination with a platform mounted on a wheel, of a receiving pan carried by said platform, burners arranged over said pan to each side, and collecting means carried by the platform.

4. In a device of the kind described, the combination with a wheeled platform, of a pan mounted on said platform provided with burners, collecting plates mounted on said platform and brushes mounted over said plates.

5. In a device of the kind described, the combination with a wheeled platform provided with a receiving pan, of collecting plates, brushes mounted over said plates and means for operating said plates.

6. In a device of the kind described, the combination with a wheeled platform carrying a receiver, of collecting plates pivotally mounted to each side of said receiver, brushes mounted over said plates and means for operating said plates.

7. In a device of the kind described, the combination with a wheeled platform carrying a receiver, of pivoted collecting plates carried by the platform, adjustable brushes mounted over said plates and means for operating said plates and brushes.

8. The combination with a wheeled platform carrying a receiver, provided with burners, of spring actuated collecting plates mounted on said platform, and adjustable rotary brushes mounted over said plates.

9. The combination with a wheeled platform carrying a receiving pan, of burners arranged over said pan, pivoted plates mounted to each side of said pan, rotary brushes mounted over said plates and means for operating said plates and brushes.

10. The combination with a wheeled platform provided with a receiving pan, of burners arranged over said pan, a tank connected to said burner, plates pivotally mounted to each side of the pan, means for operating said plates, and adjustably rotary brushes mounted over said plates.

11. The combination with a beam mounted on a wheel, of a platform mounted on said beam, a receiving pan mounted on said platform provided with burners, collecting plates mounted to each side of the pan, means for operating said plates, rotary brushes mounted over said plates, means for adjusting said brushes together with means for operating said brushes.

12. The combination with a forked beam mounted on a wheel carrying a seat, of a platform pivotally mounted on said beam provided with upwardly extending ends, a receiving pan arranged on said platform between said ends, shafts mounted in said ends carrying curved collecting plates, means for operating said shafts, arms mounted on said ends carrying brushes, burners arranged over said pan, a tank carried by one of the ends connected to said burners and means for adjusting said arms and rotating said brushes.

13. The combination with a forked beam having a wheel mounted therein, of ends carrying a platform mounted over said beam, a receiving pan mounted on said platform, collecting plates pivotally mounted to each side of the pan, bolts secured to said ends, slotted arms mounted over said plates carrying rotary brushes, adjusting means connected to said arms, and means for rotating said brushes.

14. The combination with a forked beam, of an axle mounted in the fork of said beam carrying a wheel and a pulley a platform pivotally mounted on said beam, a receiving pan carried by said platform, adjustable brushes mounted on the platform provided with pulleys, spring actuated curved collecting plates mounted on said platform under said brushes and a belt working over said pulley of the brush and pulleys of the axle.

15. In a device of the kind described, the combination with a platform, of shafts mounted on said platform provided with arms carrying plates and operating levers secured on said shafts.

16. In a device of the kind described, the combination with a platform provided with a pan, of a shaft mounted on said platform, to each side of said pan, angle arms secured on said shafts, plates mounted on said arms, levers secured on said shafts and springs arranged on said platform under said levers.

17. The combination with a wheeled platform provided with upwardly projecting ends, of a pan arranged on said platform between said ends, shafts mounted in said ends to each side of said pan, angle arms secured on said shaft provided with angled ends, curved plates provided with eyes mounted on said ends, levers secured on said shaft over the outside of one of said ends, and coiled springs arranged under said levers on said platform.

18. The combination with a wheeled platform provided with upwardly projecting ends, of bolts secured in said ends slotted arms mounted on said bolts brushes carried by said arms levers mounted in one of said ends and crank-arms carried by said levers connected to the adjacent slotted arms.

19. The combination with a wheeled platform provided with upwardly projecting ends, of bolts secured on said ends, slotted arms mounted on said bolts brushes carried by said arms, sleeves pivotally mounted on one of said ends, levers mounted in said sleeves and crank arms secured on said levers connected to the adjacent slotted arms.

20. The combination with a wheeled platform, provided with upwardly projecting ends, of bolts secured in said ends, slotted arms mounted on said bolts brushes carried by said arms ears secured on one of said ends, a sleeve provided with oppositely disposed lugs mounted in said ears, a rack secured on the end of one of said sleeves, levers mounted in said sleeves provided with hand levers, crank arms secured on said levers connected to the adjacent slotted arms, levers secured over said levers provided with hand levers adapted to engage said racks, brackets carrying racks secured to said ends adapted to be engaged by said hand levers.

SAMUEL F. SNYDER.

Witnesses:
WINFIELD H. SNYDER,
DAVID P. McDANIEL.